No. 688,855. Patented Dec. 17, 1901.
P. IMMICH.
EARTH CONDUCTOR FOR LIGHTNING CONDUCTORS.
(Application filed Oct. 7, 1901.)
(No Model.)
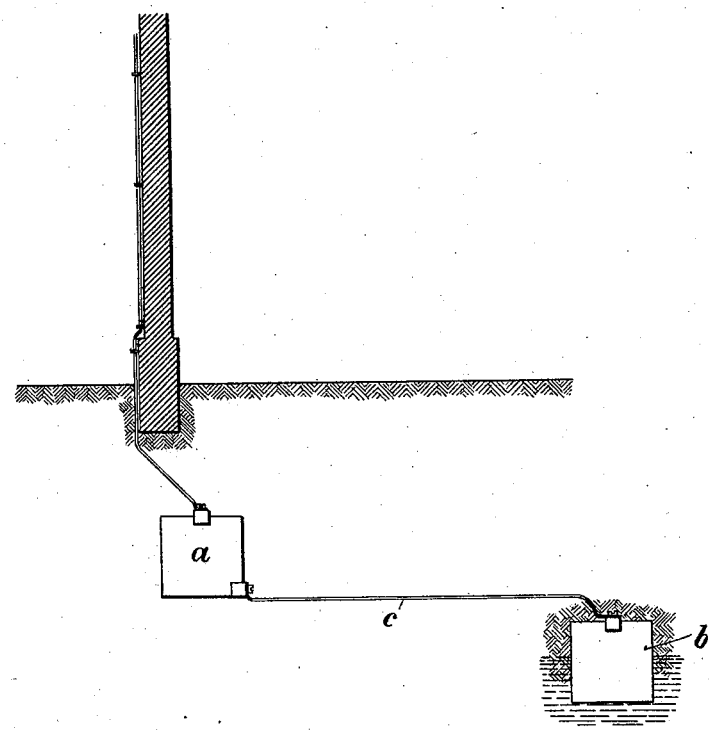
Witnesses.
A. E. Melhuish
O. Carlberg
Inventor.
Paul Immich
per R. Haddan
Attorney
THE NORRIS PETERS CO., PHOTO-LITHO., WASHINGTON, D. C.

UNITED STATES PATENT OFFICE.

PAUL IMMICH, OF CHARLOTTENBURG, GERMANY.

EARTH-CONDUCTOR FOR LIGHTNING-CONDUCTORS.

SPECIFICATION forming part of Letters Patent No. 688,855, dated December 17, 1901.

Application filed October 7, 1901. Serial No. 77,893. (No model.)

*To all whom it may concern:*

Be it known that I, PAUL IMMICH, a subject of the German Emperor, residing and having my post-office address at 23 Pestalozzistrasse, Charlottenburg, Germany, have invented certain new and useful Improvements in Earth-Conductors for Lightning-Conductors, of which the following is a specification.

This invention relates to improvements in earth-conductors for lightning-conductors.

It is well known that earth-conductors for lightning-conductors are produced in such a manner that the conductor terminates in a metal plate placed in continuously moist earth or subsoil-water. However, moist earth and water are worse conductors of electricity than metal. If, therefore, the electric current is to pass from a better conductor—for instance, from the said metal plate—into worse conductors, such as earth and subsoil-water, it encounters a new resistance. The bad conductor cannot receive and immediately pass on all the electricity with which it is suddenly charged by the better conductor, in consequence of which a condensation of electricity arises at this point, which may result in a part of the electricity remaining in the lightning-conductor and leaping over to parts of the building or the like to be protected. In order to completely overcome this resistance between the metal plate and the earth or subsoil-water surrounding same, I have invented the following arrangement.

The annexed drawing shows the improved arrangement in diagram.

At a suitable distance—for instance, about ten meters—preferably to the north of the so-called "earth conducting-plate" $a$ and at a somewhat lower level than the latter, as shown in the drawing, a second piece of metal $b$—for example, in form of a plate—is embedded, any such metal being chosen for the piece $b$ as lies nearer than the plate $a$ to the "positive" end of the scale of metals arranged according to their relative electrical tensions. The two metal plates $a$ and $b$ are conductively connected with each other by means of one or more wires or sheet-metal strips $c$, arranged in moist earth or subsoil-water. The plates or the like of different metals thus arranged form a so-called "earth element," from which even the greatest quantities of electricity can pass without any appreciable resistance into the moist earth or subsoil-water surrounding the said earth element.

What I claim is—

An earth-conductor for lightning-conductors, comprising in combination several metal bodies conductively connected with each other and with the earth-wire, said bodies being graduated both with regard to their electrical resistance and to the depth to which they are embedded in the earth or subsoil-water and forming an earth element.

In witness whereof I have signed this specification in the presence of two witnesses.

PAUL IMMICH.

Witnesses:
 HENRY HASPER,
 WOLDEMAR HAUPT.